US012420573B2

(12) United States Patent
Ikagawa et al.

(10) Patent No.: US 12,420,573 B2
(45) Date of Patent: Sep. 23, 2025

(54) RECORDING APPARATUS

(71) Applicant: SEIKO EPSON CORPORATION, Tokyo (JP)

(72) Inventors: Takamasa Ikagawa, Matsumoto (JP); Akinobu Nakahata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/588,888

(22) Filed: Feb. 27, 2024

(65) Prior Publication Data

US 2024/0198702 A1 Jun. 20, 2024

Related U.S. Application Data

(63) Continuation of application No. 18/150,459, filed on Jan. 5, 2023, now Pat. No. 11,964,474, which is a (Continued)

(30) Foreign Application Priority Data

Mar. 13, 2020 (JP) ................................ 2020-044187

(51) Int. Cl.

| | |
|---|---|
| ***B41J 2/18*** | (2006.01) |
| ***B41J 2/165*** | (2006.01) |
| ***B41J 2/185*** | (2006.01) |
| ***B41J 13/00*** | (2006.01) |
| ***B41J 13/10*** | (2006.01) |
| ***B41J 29/56*** | (2006.01) |

(52) U.S. Cl.

CPC ......... *B41J 13/106* (2013.01); *B41J 2/16505* (2013.01); *B41J 2/185* (2013.01); *B41J 13/0054* (2013.01); *B41J 13/0072* (2013.01); *B41J 13/103* (2013.01); *B41J 29/56* (2013.01); *B41J 2002/1856* (2013.01)

(58) Field of Classification Search

CPC .............................. B41J 2/16505; B41J 2/185

See application file for complete search history.

(56) References Cited

U.S. PATENT DOCUMENTS

2020/0047507 A1 2/2020 Nakai et al.
2020/0108616 A1 4/2020 Nakagawa et al.

FOREIGN PATENT DOCUMENTS

CN 204222385 3/2015
JP H04-151170 5/1992

(Continued)

*Primary Examiner* — Sharon Polk

(74) *Attorney, Agent, or Firm* — WORKMAN NYDEGGER

(57) ABSTRACT

A recording apparatus includes a plurality of medium containing units that is provided along a vertical direction and contains a medium before recording, a liquid ejecting head that performs recording by ejecting liquid toward the medium, and at least one liquid containing unit that contains the liquid. The plurality of medium containing units includes a first medium containing unit located at an uppermost position, and a second medium containing unit located below the first medium containing unit. A size of the first medium containing unit in a medium feeding-out direction, in which the medium is fed out, is smaller than a size of the second medium containing unit in the medium feeding-out direction, and the at least one liquid containing unit is provided above the second medium containing unit in such a way as to overlap with the first medium containing unit in a vertical direction.

11 Claims, 8 Drawing Sheets

Related U.S. Application Data continuation of application No. 17/197,454, filed on Mar. 10, 2021, now Pat. No. 11,597,220.

(56) References Cited

FOREIGN PATENT DOCUMENTS

| | | | |
|---|---|---|---|
| JP | H05-095938 | | 12/1993 |
| JP | H05-095938 | U | 12/1993 |
| JP | 09-77288 | | 3/1997 |
| JP | 2007-099457 | A | 4/2007 |
| JP | 2008-087165 | | 4/2008 |
| JP | 2008-179436 | A | 8/2008 |
| JP | 2014-069911 | A | 4/2014 |
| JP | 2015-112844 | A | 6/2015 |
| JP | 2019-155734 | A | 9/2019 |

RECORDING APPARATUS

The present application is a Continuation of U.S. patent application Ser. No. 18/150,459, filed Jan. 5, 2023 which is a Continuation of U.S. patent application Ser. No. 17/197,454, filed Mar. 10, 2021, which is based on, and claims priority from JP Application Serial Number 2020-044187, filed Mar. 13, 2020, the disclosures of which are hereby incorporated by reference herein in their entirety.

BACKGROUND

1. Technical Field

Embodiments of the present disclosure relate to a recording apparatus that performs recording on a medium.

2. Related Art

Among recording apparatuses such as facsimiles and printers is an ink-jet recording apparatus that performs recording by ejecting ink as an example of liquid toward recording paper as an example of a medium. Ink containers that contain ink are mounted on this kind of recording apparatus. The ink containers mentioned here include an ink container that contains ink before ejection and an ink container that contains, as waste ink, ink ejected from a recording head. JP-A-2014-069911 discloses an ink-jet recording apparatus in which plural ink tanks as ink containers are arranged horizontally below a paper-feeding tray.

Recently, ink containers have been demanded to have large ink-containing capacity. If the size of ink containers is increased so as to satisfy the demand, the size of the apparatus will also inevitably increases. In particular, if a paper-feeding tray and ink containers are arranged simply in a vertical direction as in the ink-jet recording apparatus disclosed in JP-A-2014-069911, the size of the apparatus in the height direction increases, which is not desirable.

SUMMARY

A recording apparatus according to a certain aspect of the present disclosure includes: a plurality of medium containing units that is provided along a vertical direction and contains a medium before recording; a liquid ejecting head that performs recording by ejecting liquid toward the medium; and at least one liquid containing unit that contains the liquid; wherein the plurality of medium containing units includes a first medium containing unit located at an uppermost position, and a second medium containing unit located below the first medium containing unit, a size of the first medium containing unit in a medium feeding-out direction, in which the medium is fed out, is smaller than a size of the second medium containing unit in the medium feeding-out direction, and the at least one liquid containing unit is provided above the second medium containing unit in such a way as to overlap with the first medium containing unit in the vertical direction when viewed from the side surface.

DESCRIPTION OF EXEMPLARY EMBODIMENTS

Figure 1:
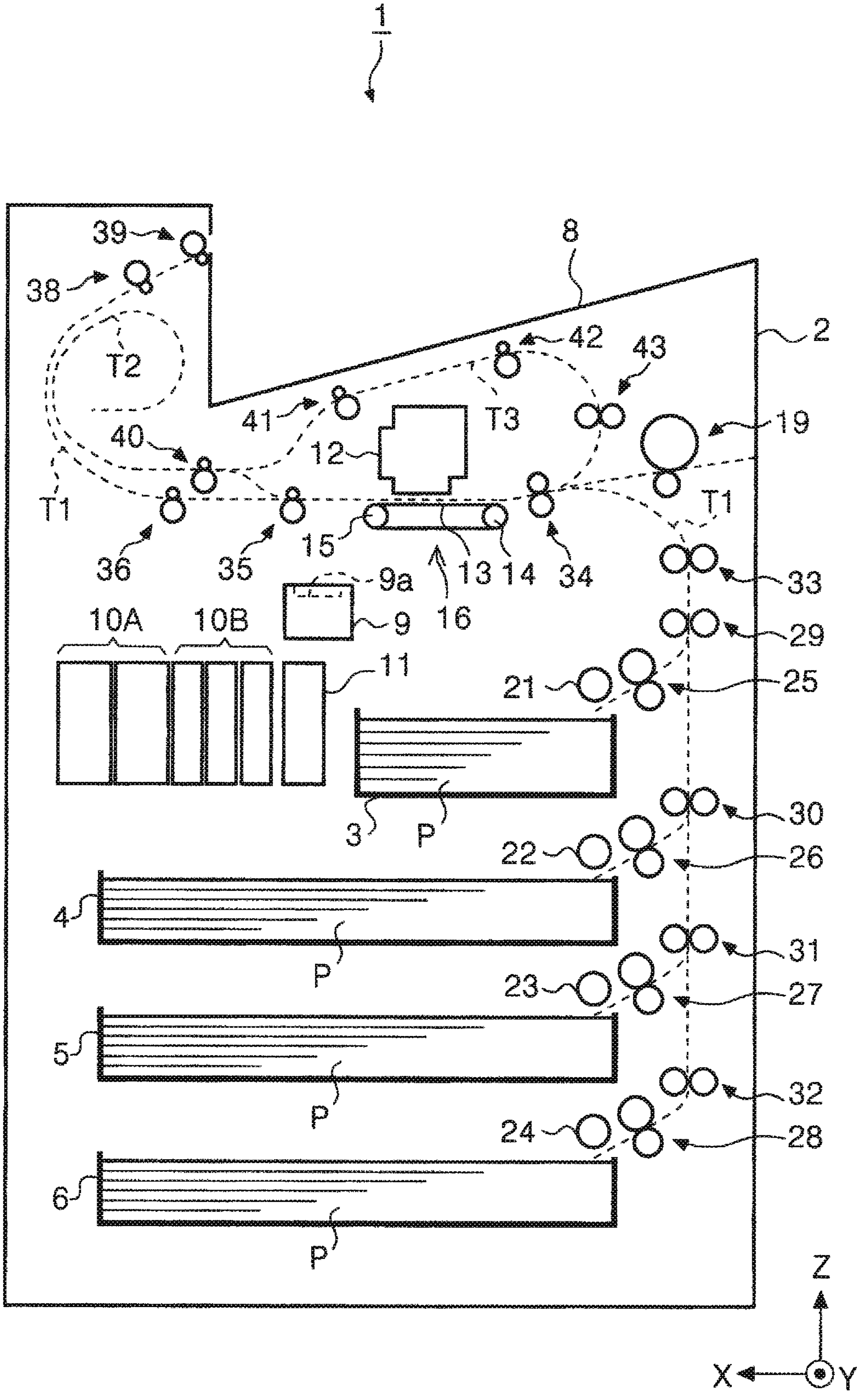
FIG. 1 is a diagram that illustrates paper transportation paths in an ink-jet printer.

First, a brief overview of the present disclosure is presented below.

A recording apparatus according to a first mode includes: a plurality of medium containing units that is provided along a vertical direction and contains a medium before recording; a liquid ejecting head that is located vertically above the plurality of medium containing units and performs recording by ejecting liquid toward the medium; and at least one liquid containing unit that contains the liquid; wherein the plurality of medium containing units includes a first medium containing unit located at an uppermost position, and a second medium containing unit located below the first medium containing unit, a size of the first medium containing unit in a medium feeding-out direction, in which the medium is fed out, is smaller than a size of the second medium containing unit in the medium feeding-out direction, and the at least one liquid containing unit is provided above the second medium containing unit in such a way as to overlap with the first medium containing unit in the vertical direction when viewed from the side surface.

In this mode, the size of the first medium containing unit in the medium feeding-out direction is smaller than the size of the second medium containing unit in the medium feeding-out direction, and the at least one liquid containing unit is provided above the second medium containing unit in such a way as to overlap with the first medium containing unit in the vertical direction. That is, the liquid containing unit is arranged in such a way as to take advantage of a space formed due to the difference between the size of the first medium containing unit and the size of the second medium containing unit. Therefore, it is possible to reduce the size of the apparatus in the height direction when viewed from the side surface.

A second mode is that the recording apparatus according to the first mode includes, as the liquid containing unit: a first liquid containing unit that contains the liquid before ejection from the liquid ejecting head; and a second liquid containing unit that contains the liquid as waste liquid after ejection from the liquid ejecting head; wherein the first liquid containing unit and the second liquid containing unit are provided above the second medium containing unit in such a way as to overlap with the first medium containing unit in the vertical direction when viewed from the side surface.

This mode makes it possible to obtain the same operational effect as that of the first mode described above in a structure in which the recording apparatus includes, as the liquid containing unit: a first liquid containing unit that contains the liquid before ejection from the liquid ejecting head; and a second liquid containing unit that contains the liquid as waste liquid after ejection from the liquid ejecting head.

A third mode is that the recording apparatus according to the second mode further includes: a cap unit that includes a capping portion and is configured to switch between a capping position and a distanced position, the capping portion being configured to cap the liquid ejecting head, the capping position being a position where the capping portion caps the liquid ejecting head, the distanced position being a position where the capping portion is away from the liquid ejecting head; wherein, when the cap unit is located at the distanced position, the second liquid containing unit is located at a position that is closer to the cap unit than the first liquid containing unit is.

In this mode, when the cap unit is located at the distanced position, the second liquid containing unit is located at a position that is closer to the cap unit than the first liquid containing unit is. This structure makes the flow passage of the liquid between the cap unit and the second liquid containing unit shorter. Because of the shorter flow passage, it is possible to send the liquid from the cap unit to the second liquid containing unit quickly.

A fourth mode is that, in any of the first, second, and third modes, the number of sheets of the medium which the first medium containing unit is able to accommodate is larger than the number of sheets of the medium which the second medium containing unit is able to accommodate. In this mode, since the number of sheets of the medium which the first medium containing unit is able to accommodate is larger than the number of sheets of the medium which the second medium containing unit is able to accommodate, the height of the first medium containing unit is greater than the height of the second medium containing unit. Therefore, the amount of the liquid which the liquid containing unit can contain increases.

A fifth mode is that, in the fourth mode, a size of a largest-sized medium in the medium feeding-out direction among sizes which the first medium containing unit is able to accommodate corresponds to a longer side of an A4-sized medium, and a size of a largest-sized medium in the medium feeding-out direction among sizes which the second medium containing unit is able to accommodate corresponds to a longer side of an A3-sized medium.

In this mode, since the size of the largest-sized medium in the medium feeding-out direction among sizes which the first medium containing unit is able to accommodate corresponds to the longer side of an A4-sized medium, and since the size of the largest-sized medium in the medium feeding-out direction among sizes which the second medium containing unit is able to accommodate corresponds to the longer side of an A3-sized medium, it is possible to put a larger number of sheets of the medium, specifically, the A4-sized medium that is more frequently used, into the first medium containing unit than the second medium containing unit. When the first medium containing unit is able to accommodate a type of medium that is more frequently used, the first medium containing unit will be accessed more frequently. Since the first medium containing unit is located at the uppermost position among the plurality of medium containing units, however, a user will be able to access the first medium containing unit in a more comfortable posture, resulting in enhanced user friendliness. Moreover, since the at least one liquid containing unit is mounted on substantially the same level of height as the first medium containing unit, it is easy to access the liquid containing unit, similarly to the first medium containing unit. This enhances user friendliness.

A sixth mode is that, in any of the first to fifth modes, the first medium containing unit is configured to be attached to an apparatus body that includes the liquid ejecting head and be drawn out of the apparatus body, the first medium containing unit includes an exterior member that constitutes an exterior surface part of the apparatus body when the first medium containing unit is attached to the apparatus body, and the at least one liquid containing unit provided in such a way as to overlap with the first medium containing unit in the vertical direction is hidden behind the exterior member when the first medium containing unit is attached to the apparatus body, and becomes exposed to an outside when the first medium containing unit is drawn out of the apparatus body.

In this mode, the liquid containing unit is hidden behind the exterior member when the first medium containing unit is attached to the apparatus body, and becomes exposed to an outside when the first medium containing unit is drawn out of the apparatus body. Therefore, it is unnecessary to provide a dedicated cover exclusively for the purpose of the opening and closing of the liquid containing unit. Therefore, it is possible to reduce the cost of the apparatus.

A seventh mode is that, in the sixth mode, the first medium containing unit has a recess used as a finger-hooking portion when the first medium containing unit is drawn out of the apparatus body, and a locking portion that is switchable between a locked state, in which the locking portion locks in a state of filling a space of the recess, and an unlocked state, in which the lock is released, is configured to be detachably attached to the recess.

In this mode, the first medium containing unit has a recess used as a finger-hooking portion when the first medium containing unit is drawn out of the apparatus body, and a locking portion that is switchable between a locked state, in which the locking portion locks in a state of filling a space of the recess, and an unlocked state, in which the lock is released, is configured to be detachably attached to the recess. Therefore, it is possible to prevent unintended access to the first medium containing unit and the liquid containing unit.

An eighth mode is that, in any of the first to seventh modes, the at least one liquid containing unit provided above the second medium containing unit in such a way as to overlap with the first medium containing unit in the vertical direction is entirely inside an area of the second medium containing unit in the medium feeding-out direction. In this mode, since the liquid containing unit is entirely inside an area of the second medium containing unit in the medium feeding-out direction, it is possible to reduce the size of the apparatus in the medium feeding-out direction.

Next, embodiments of the present disclosure will now be explained with specific examples.

An ink-jet printer 1 that performs recording by ejecting ink toward recording paper is described below as an example of a recording apparatus. The recording paper described below is an example of a medium. The ink described below is an example of liquid. In the description below, a shorter term "printer 1" is used for the ink-jet printer 1. The X-Y-Z coordinate system shown in each of the accompanying drawings is an orthogonal coordinate system. The Y-axis direction of the coordinate system represents the medium width direction intersecting with the medium transportation direction. The medium width direction is the same as the apparatus depth direction. Among sides constituting the lateral surface part of an apparatus body 2 in the present embodiment, the +Y-directional side is the front of the apparatus body 2, and the −Y-directional side is the back of the apparatus body 2.

The X-axis direction represents the apparatus width direction. As viewed from an operator of the printer 1, the +X direction is the direction toward the left-hand side, and the −X direction is the direction toward the right-hand side. The −X direction is a paper feeding-out direction, in which paper is fed out of each paper cassette described below. The Z-axis direction is the vertical direction, that is, the apparatus height direction. The +Z direction is the direction going upward. The −Z direction is the direction going downward. In the description below, the direction in which recording paper is transported may be referred to as “downstream”. The opposite direction may be referred to as “upstream”. In each of the accompanying drawings, paper transportation paths are indicated by broken-line curves. In the printer 1, paper is transported along the paper transportation paths indicated by the broken-line curves.

The printer 1 includes a plurality of paper cassettes arranged in the vertical direction in the lower part of the apparatus body 2 equipped with a line head 12 described later. The paper cassette is an example of a medium containing unit. In the present embodiment, these paper cassettes, including a first paper cassette 3, which is the top one, and including second, third, and fourth paper cassettes 4, 5, and 6 in this order as viewed downward from the first paper cassette 3, are provided such that each of these paper cassettes is switchable between a state of being attached to the apparatus body 2 and a state of being drawn out of the apparatus body 2. The reference alphabet P denotes sheets of recording paper contained in each paper cassette. Each paper cassette may be configured to be completely detachable from the apparatus body 2.

Each paper cassette is provided with a pickup roller that feeds out recording paper contained in it in the −X direction. Specifically, the first paper cassette 3 is provided with a pickup roller 21. The second paper cassette 4 is provided with a pickup roller 22. The third paper cassette 5 is provided with a pickup roller 23. The fourth paper cassette 6 is provided with a pickup roller 24.

Each paper cassette is further provided with a pair of feeding rollers. The recording paper fed out in the −X direction is further fed by the pair of feeding rollers in an obliquely upward direction that includes a −X-directional component and a +Z-directional component. Specifically, the first paper cassette 3 is provided with a pair of feeding rollers 25. The second paper cassette 4 is provided with a pair of feeding rollers 26. The third paper cassette 5 is provided with a pair of feeding rollers 27. The fourth paper cassette 6 is provided with a pair of feeding rollers 28. The term “pair of rollers” used below means a pair that is made up of a driving roller and a driven roller, wherein the driving roller is driven by a motor that is not illustrated, and the driven roller is in contact with the driving roller and rotates as a slave by receiving a driving force for rotation from the driving roller when the driving roller rotates, unless otherwise described.

The recording paper fed out of the first paper cassette 3 and fed obliquely upward by the pair of feeding rollers 25 receives a transportation force from a pair of transportation rollers 29 and next from a pair of transportation rollers 33 to be transported to a pair of transportation rollers 34. The recording paper fed out of the second paper cassette 4 and fed obliquely upward by the pair of feeding rollers 26 receives a transportation force from a pair of transportation rollers 30, next from the pair of transportation rollers 29, and next from the pair of transportation rollers 33 to be transported to the pair of transportation rollers 34. The recording paper fed out of the third paper cassette 5 and fed obliquely upward by the pair of feeding rollers 27 receives a transportation force from a pair of transportation rollers 31, next from the pair of transportation rollers 30, next from the pair of transportation rollers 29, and next from the pair of transportation rollers 33 to be transported to the pair of transportation rollers 34. The recording paper fed out of the fourth paper cassette 6 and fed obliquely upward by the pair of feeding rollers 28 receives a transportation force from a pair of transportation rollers 32, next from the pair of transportation rollers 31, next from the pair of transportation rollers 30, next from the pair of transportation rollers 29, and next from the pair of transportation rollers 33 to be transported to the pair of transportation rollers 34. The reference sign T1 denotes a transportation path along which the recording paper fed out of each paper cassette is transported till arriving at the pair of transportation rollers 34.

A pair of feeding rollers 19 for supplying recording paper from a port in the −X-directional side of the apparatus body 2 is provided over the pair of transportation rollers 33. The recording paper fed by the pair of feeding rollers 19 is also transported toward the pair of transportation rollers 34.

The recording paper that receives a transportation force from the pair of transportation rollers 34 is sent to a space between the line head 12, which is an example of a liquid ejecting head, and a transportation belt 13. In other words, the recording paper is sent to a recording position where the recording paper and the line head 12 face each other. The line head 12 executes recording by ejecting ink, which is an example of liquid, onto the surface of the recording paper. The line head 12 is an ink ejecting head configured such that nozzles for ejecting ink are arranged throughout the entire area in the paper width direction. The line head 12, as an ink ejecting head having such a structure, is capable of executing recording throughout the entire area in the paper width direction without moving in the paper width direction. However, the ink ejecting head is not limited to a line head. The ink ejecting head may be a serial-type head that is mounted on a carriage and ejects ink while moving in the paper width direction.

The transportation belt 13 is an endless belt wound around pulleys 14 and 15. Either one of the pulleys 14 and 15 is, or both are, driven by a motor that is not illustrated. The transportation belt 13 turns due to this drive force. Recording paper is transported through a position where it faces the line head 12 while being held with adsorption on the belt surface of the transportation belt 13. Known methods such as an air vacuuming method, an electrostatic chuck method, and the like can be used for holding the recording paper with adsorption on the belt surface of the transportation belt 13. In the present embodiment, the paper transportation path extends in the horizontal direction at the position where the recording paper faces the line head 12.

Figure 2:
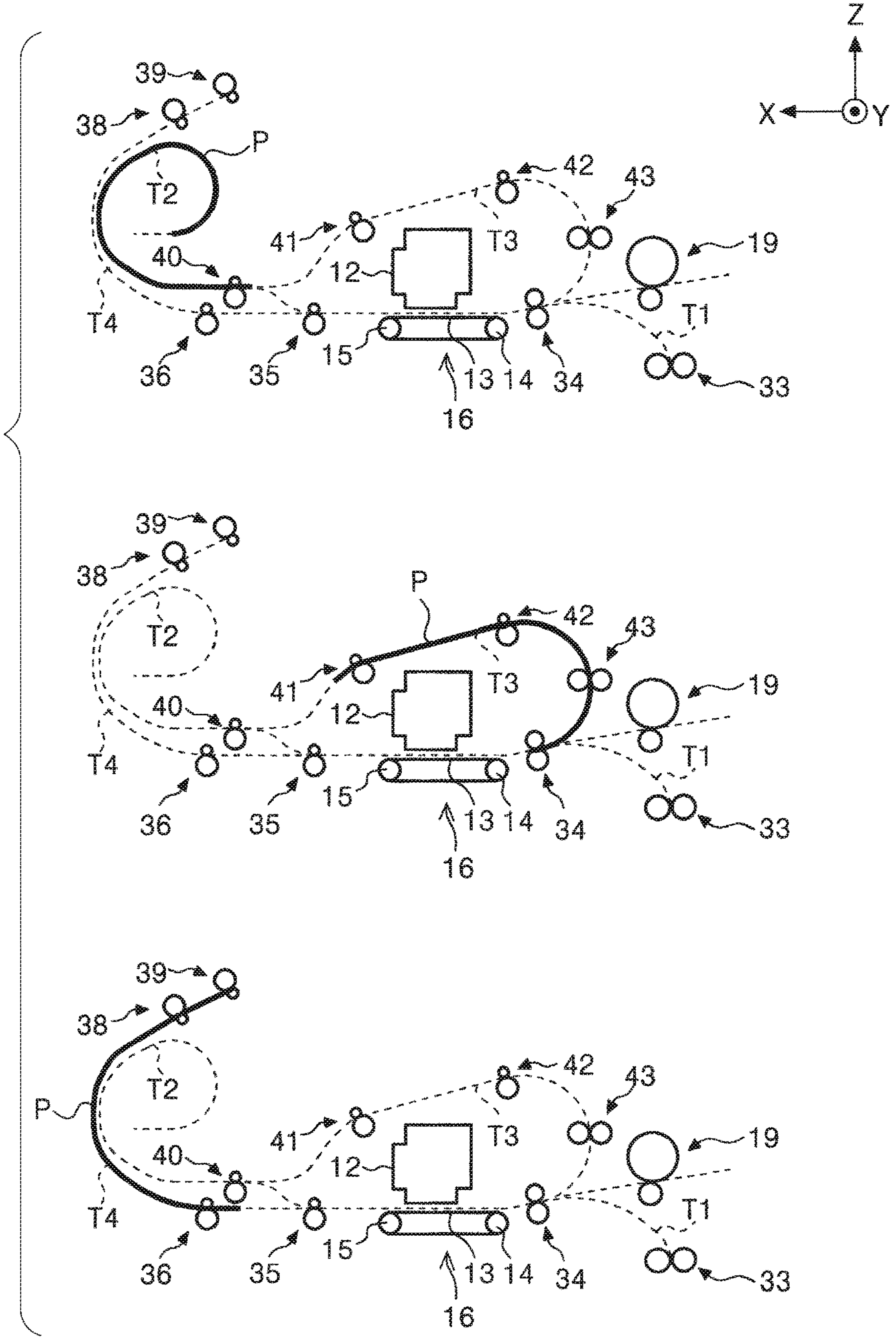
FIG. 2 is a diagram that illustrates the transportation of paper when double-sided printing is performed.

After recording on the first side of a sheet of recording paper by the line head 12, the recording paper is transported by a pair of transportation rollers 35 located downstream of the transportation belt 13 toward a pair of transportation rollers 36 or toward a pair of transportation rollers 40. With reference to FIG. 2, a more detailed explanation of the paper transportation paths is given below. A path switching flap that is not illustrated is provided downstream of the pair of transportation rollers 35. Since the path of the recording paper that receives a transportation force from the pair of transportation rollers 32 is switched by the path switching flap, the recording paper is transported to either one of the pair of transportation rollers 36 and the pair of transportation rollers 40.

If recording on both of the first side of a sheet of recording paper and the second side, which is the opposite of the first side, is not performed, or in other words, if double-sided printing is not performed, the recording paper is transported from the pair of transportation rollers 35 to the pair of transportation rollers 36 and is then ejected toward an ejection tray 8 (see FIG. 1) through an ejection path T4 as illustrated in the bottom part of FIG. 2. A pair of transportation rollers 38 and a pair of transportation rollers 39 are provided on the ejection path T4. In FIG. 2, the reference alphabet P denotes a sheet of recording paper that is transported.

If recording on both of the first side of a sheet of recording paper and the second side, which is the opposite of the first side, is performed, or in other words, if double-sided printing is performed, the recording paper is transported from the pair of transportation rollers 35 to the pair of transportation rollers 40 and then goes into a switchback path T2 as illustrated in the top part of FIG. 2. After the recording paper goes into the switchback path T2, the direction of rotation of the pair of transportation rollers 40 is switched, and the recording paper goes into a turn-over-the-sheet path T3 as illustrated in the middle part of FIG. 2. The recording paper is transported by pairs of transportation rollers 41, 42, and 43 to the pair of transportation rollers 34.

Referring back to FIG. 1, the reference numeral 10A, 10B denotes an ink container as an example of a liquid containing unit. Ink before ejection is contained in the ink containers 10A and 10B. The ink container 10A, 10B is an example of a first liquid containing unit, too. Ink that is to be ejected from the line head 12 is supplied from the ink containers 10A and 10B to the line head 12 through tubes that are not illustrated. In the present embodiment, the ink containers 10A constitute a black ink containing unit, inside which black ink is contained. Specifically, this black ink containing unit is made up of two ink tanks arranged next to each other in the X-axis direction. In the present embodiment, the ink containers 10B constitute a CMY ink containing unit, inside which cyan ink, magenta ink, and yellow ink are contained, and which is made up of three ink tanks arranged next to each other in the X-axis direction.

In FIG. 1, the reference numeral 9 denotes a cap unit. The cap unit 9 includes a capping portion 9*a* configured to cap the line head 12. The cap unit 9 is able to change its position between a capping position where the capping portion 9*a* caps the line head 12 (see FIG. 4) and a distanced position where the capping portion 9*a* is away from the line head 12 (see FIGS. 1 and 3). In FIG. 1, the reference numeral 11 denotes a waste liquid container that serves as a reservoir for waste liquid, specifically, ink ejected for the purpose of maintenance from the line head 12 into the capping portion 9*a*. The waste liquid container 11 is an example of a second liquid containing unit. The ink ejected for the purpose of maintenance from the line head 12 into the capping portion 9*a* drains as waste liquid to be sent from the capping portion 9*a* into the waste liquid container 11 through a tube that is not illustrated. In the present embodiment, the waste liquid container 11 and the ink containers 10A and 10B are arranged in a row in the X-axis direction.

Figure 3:
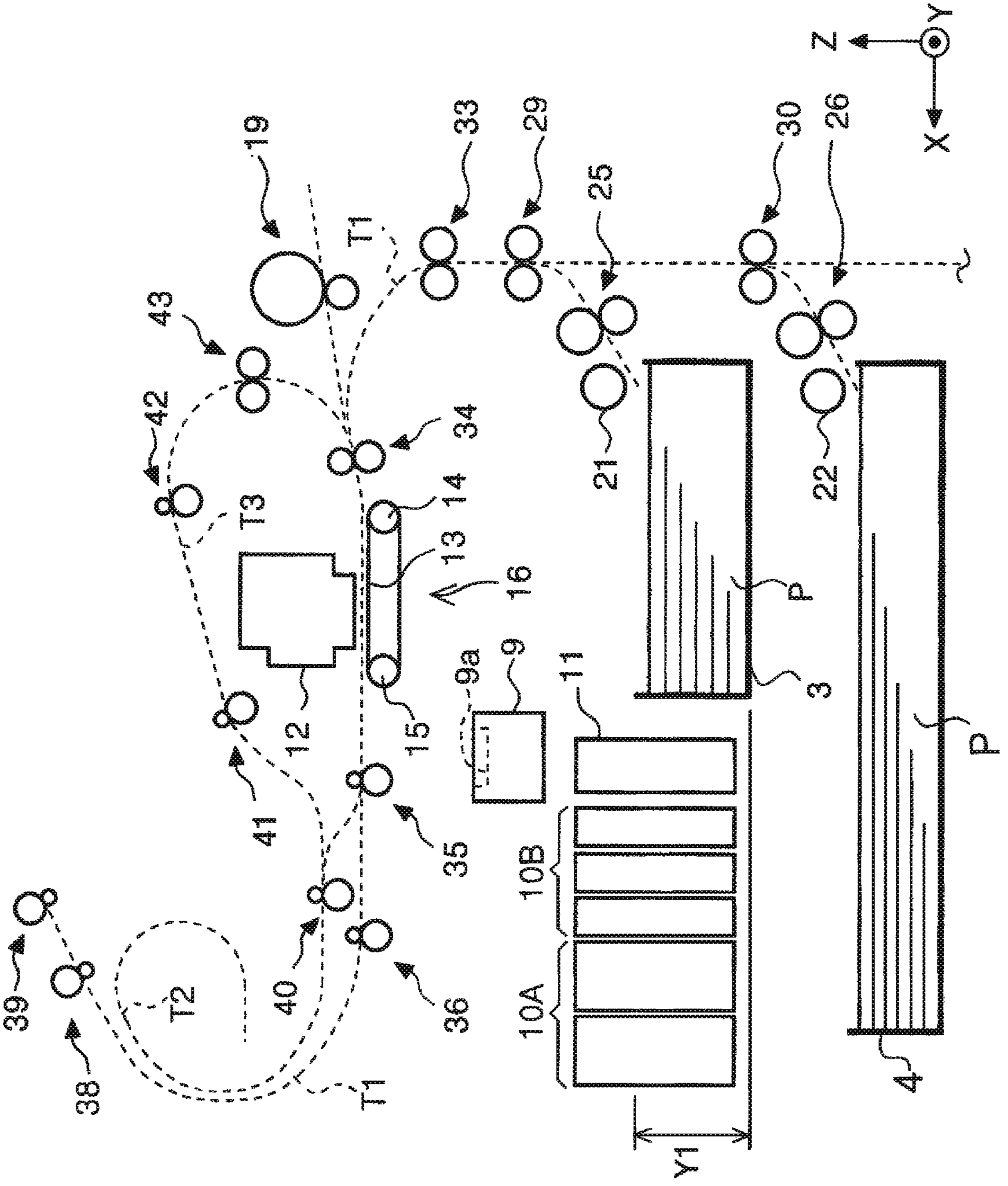
FIG. 3 is a partial enlarged view of FIG. 1 and illustrates a state in which a cap unit is located at a distanced position and in which a belt unit faces a line head.
Figure 4:
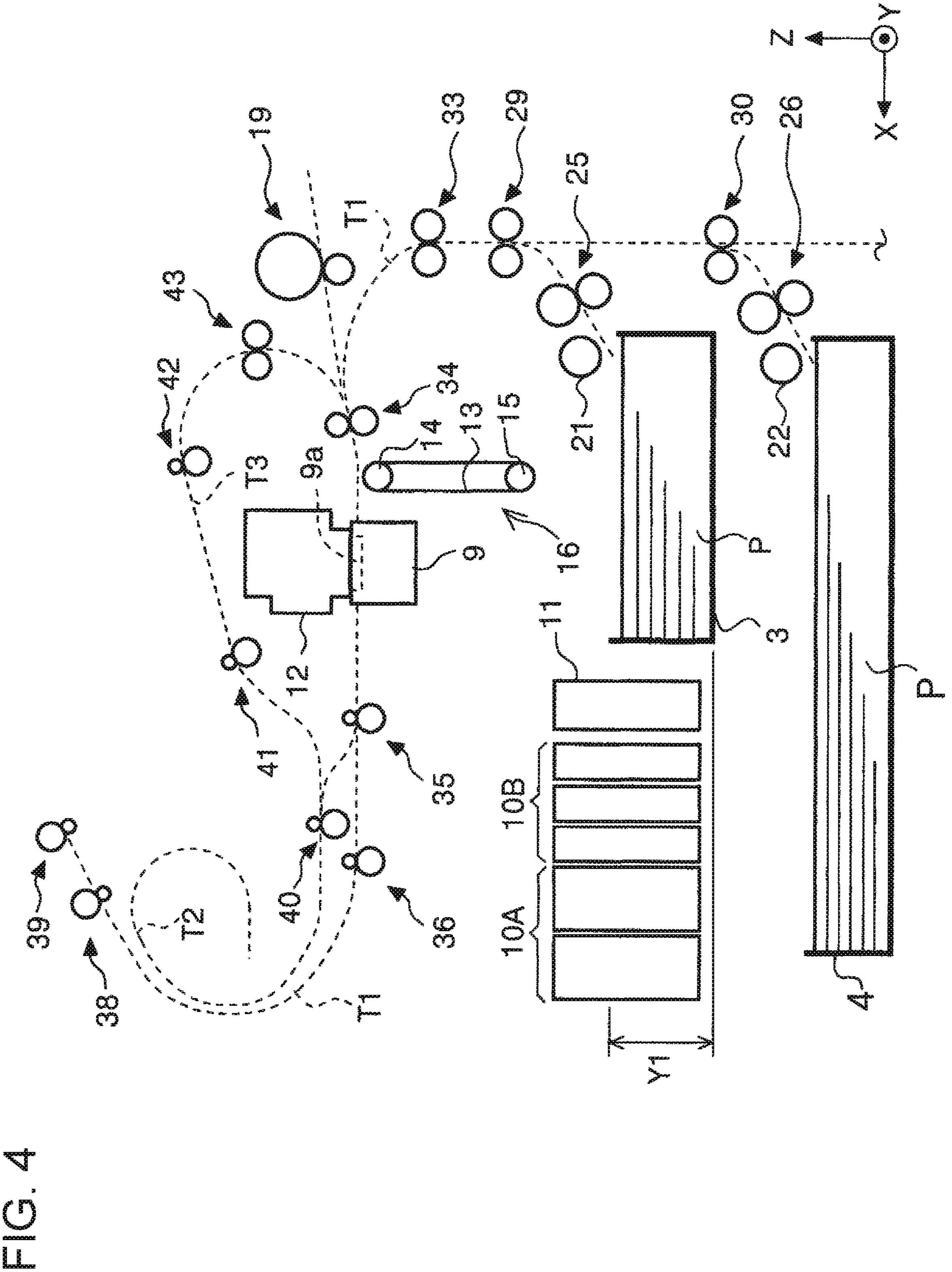
FIG. 4 is a partial enlarged view of FIG. 1 and illustrates a state in which the cap unit is located at a capping position and in which the belt unit is away from the line head.

With reference to FIGS. 3 and 4, the operation of the cap unit 9 will now be further explained. The transportation belt 13 and the pulleys 14 and 15 constitute a belt unit 16. In the present embodiment, the belt unit 16 is configured to rotate around the center of the rotation shaft of the pulley 14 and is therefore able to change its orientation between a position where the transportation belt 13 faces the line head 12 as illustrated in FIG. 3 and a position where the transportation belt 13 is away from the line head 12 as illustrated in FIG. 4. A motor that is not illustrated supplies motive power for changing the orientation of the belt unit 16 between these positions.

The cap unit 9 is movably guided by a guide unit that is not illustrated in the direction intersecting with the X-axis direction and with the Z-axis direction. By receiving motive power supplied from a motor that is not illustrated, the cap unit 9 switches between the distanced position where the capping portion 9*a* is away from the line head 12 as illustrated in FIG. 3 and the capping position where the capping portion 9*a* caps the line head 12 as illustrated in FIG. 4.

The area where the orientation of the belt unit 16 is configured to change and the area where the position of the cap unit 9 is configured to change interfere with each other. In order to avoid collision, the cap unit 9 stays at the distanced position when the belt unit 16 is oriented such that the transportation belt 13 faces the line head 12 as illustrated in FIG. 3. Before the cap unit 9 moves to the capping position from this state, the belt unit 16 goes away from the line head 12. After this movement of the belt unit 16, the cap unit 9 moves to the capping position, resulting in the state illustrated in FIG. 4. Before the belt unit 16 is switched into the position where the transportation belt 13 faces the line head 12, the cap unit 9 moves to the distanced position. After this movement of the cap unit 9, the belt unit 16 is switched into the position where the transportation belt 13 faces the line head 12.

In the structure described above, a plurality of paper containing units includes the first paper cassette 3, which is located at the uppermost position, and the second paper cassette 4, which is located below the first paper cassette 3. The size of the first paper cassette 3 in the direction in which paper is fed out, that is, its size in the X-axis direction, is smaller than the size of the second paper cassette 4 in the direction in which paper is fed out. Because of this structure, there is a space in the +X direction with respect to the first paper cassette 3. The ink containers 10A and 10B and the waste liquid container 11 are provided above the second paper cassette 4 in such a way as to overlap with the first paper cassette 3 in the vertical direction. In FIGS. 3 and 4, the reference sign Y1 denotes a range occupied by the first paper cassette 3 in the vertical direction. As is clear from these figures, the ink containers 10A and 10B and the waste liquid container 11 are provided such that there is a vertical overlap with the first paper cassette 3. As described above, the ink containers 10A and 10B and the waste liquid container 11 are arranged in a space that is formed above the second paper cassette 4 due to the difference between the size of the first paper cassette 3 and the size of the second paper cassette 4. Therefore, it is possible to reduce the size of the apparatus in the height direction.

Although both the waste liquid container 11 and the ink containers 10A and 10B as an example of liquid containing units are provided in the space formed above the second paper cassette 4 in the present embodiment, the ink containers 10A and 10B only may be provided in this space, or the waste liquid container 11 only may be provided in this space. The ink containers that contain ink before ejection may be provided not only in the space formed above the second paper cassette 4 but also at other positions or another position. The same holds true for the waste liquid container that contains waste ink after ejection.

As is clear from FIGS. 1, 2, and 3, when the cap unit 9 is located at the distanced position, the waste liquid container 11 is located at a position that is closer to the cap unit 9 than the ink containers 10A and 10B are. This structure makes the flow passage of ink between the cap unit 9 and the waste liquid container 11 shorter. Because of the shorter flow passage, it is possible to send the ink from the cap unit 9 to the waste liquid container 11 quickly.

In the present embodiment, the number of sheets of recording paper which the first paper cassette 3 is able to accommodate is larger than the number of sheets of recording paper which the second paper cassette 4 is able to accommodate. In addition, the size of largest-sized recording paper in a paper feeding-out direction, that is, its size in the X-axis direction, among sizes which the first paper cassette 3 is able to accommodate corresponds to the longer side of A4-sized paper. The size of largest-sized recording paper in the paper feeding-out direction among sizes which the second paper cassette 4 is able to accommodate corresponds to the longer side of A3-sized paper. Therefore, it is possible to put a larger number of sheets of recording paper, specifically, A4-sized paper that is more frequently used, into the first paper cassette 3 than the second paper cassette 4. In addition, since the height of the first paper cassette 3 is greater than the height of the second paper cassette 4, the amount of ink which the ink containers 10A and 10B are able to contain increases.

When the first paper cassette 3 is able to accommodate a type of recording paper that is more frequently used, the first paper cassette 3 will be accessed more frequently. Since the first paper cassette 3 is located at the uppermost position among the plurality of paper cassettes, however, a user will be able to access the first paper cassette 3 in a more comfortable posture, resulting in enhanced user friendliness. Moreover, since the ink containers 10A and 10B and the waste liquid container 11 are mounted on substantially the same level of height as the first paper cassette 3, it is easy to access the ink containers 10A and 10B and the waste liquid container 11, similarly to the first paper cassette 3. This enhances user friendliness.

Figure 5:
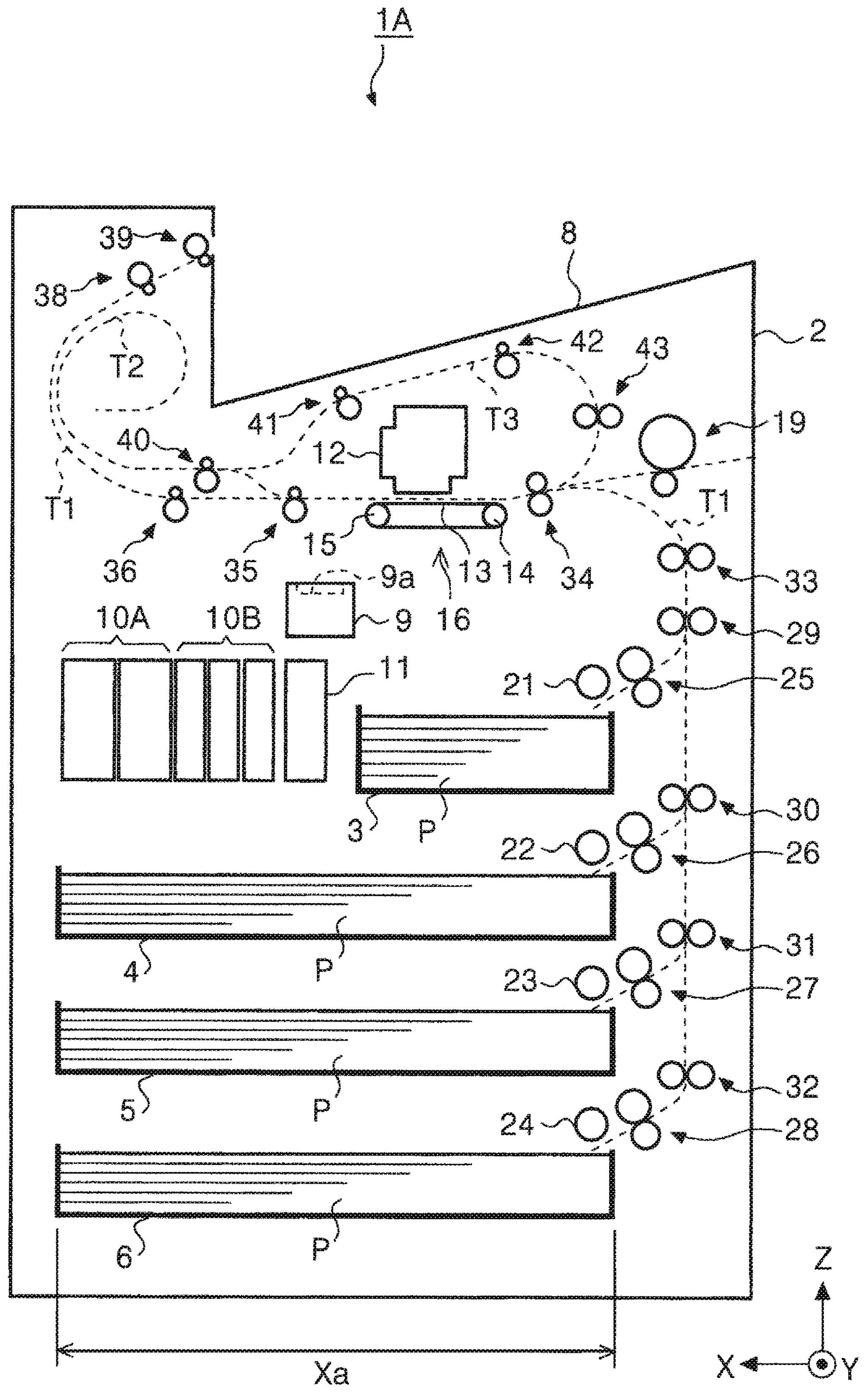
FIG. 5 is a diagram that illustrates paper transportation paths in an ink-jet printer according to another embodiment.

The ink containers 10A and 10B and the waste liquid container 11 may be arranged in their entirety inside the area of the second paper cassette 4 in the paper feeding-out direction, that is, in the X-axis direction, as in a printer 1A illustrated in FIG. 5. In FIG. 5, the reference sign Xa denotes a range occupied by the second paper cassette 4 in the paper feeding-out direction. The ink containers 10A and 10B and the waste liquid container 11 are completely within the range Xa. This structure makes it possible to reduce the size of the apparatus in the paper feeding-out direction.

Figure 6:
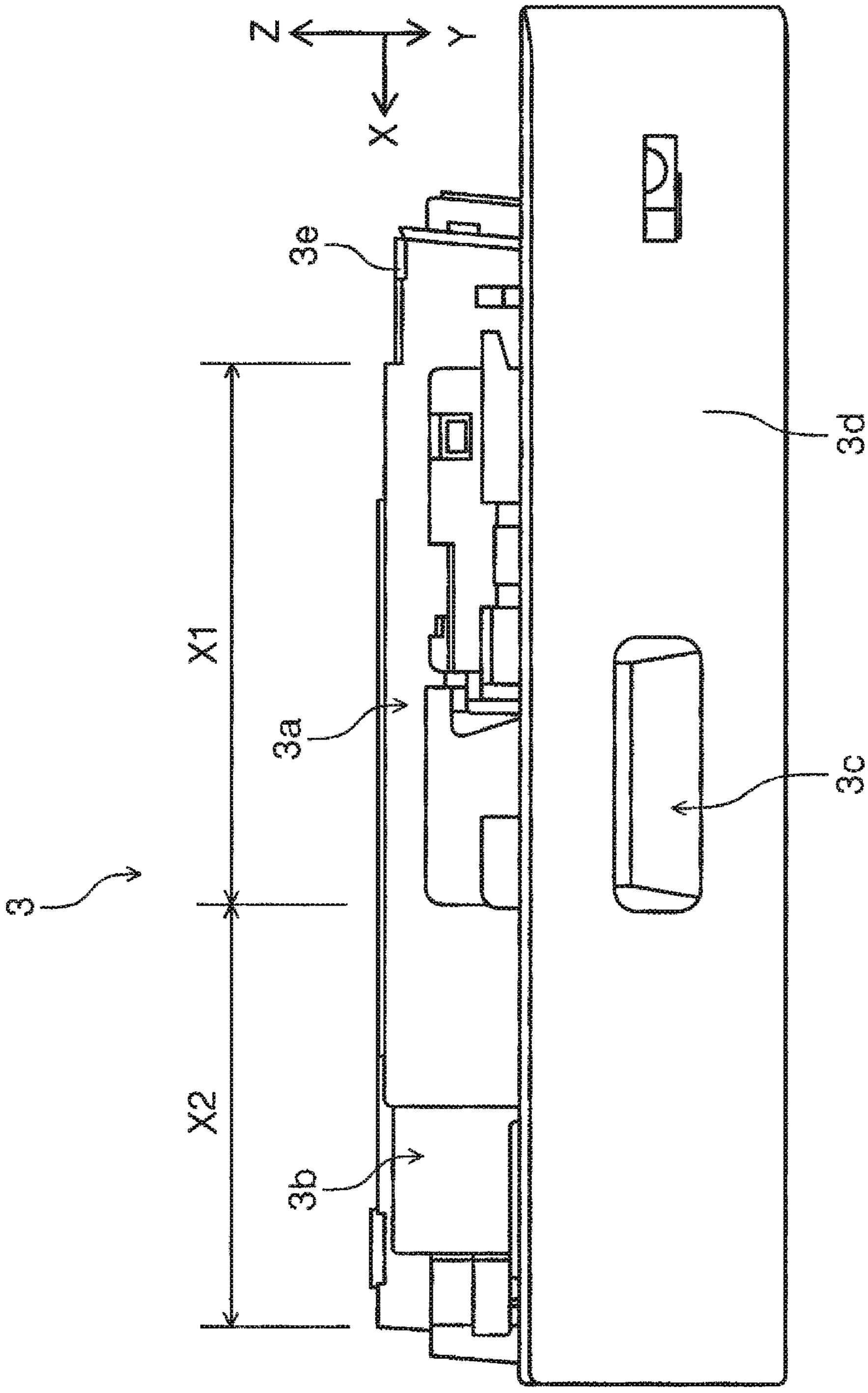
FIG. 6 is an overall perspective view of a first paper cassette.
Figure 7:
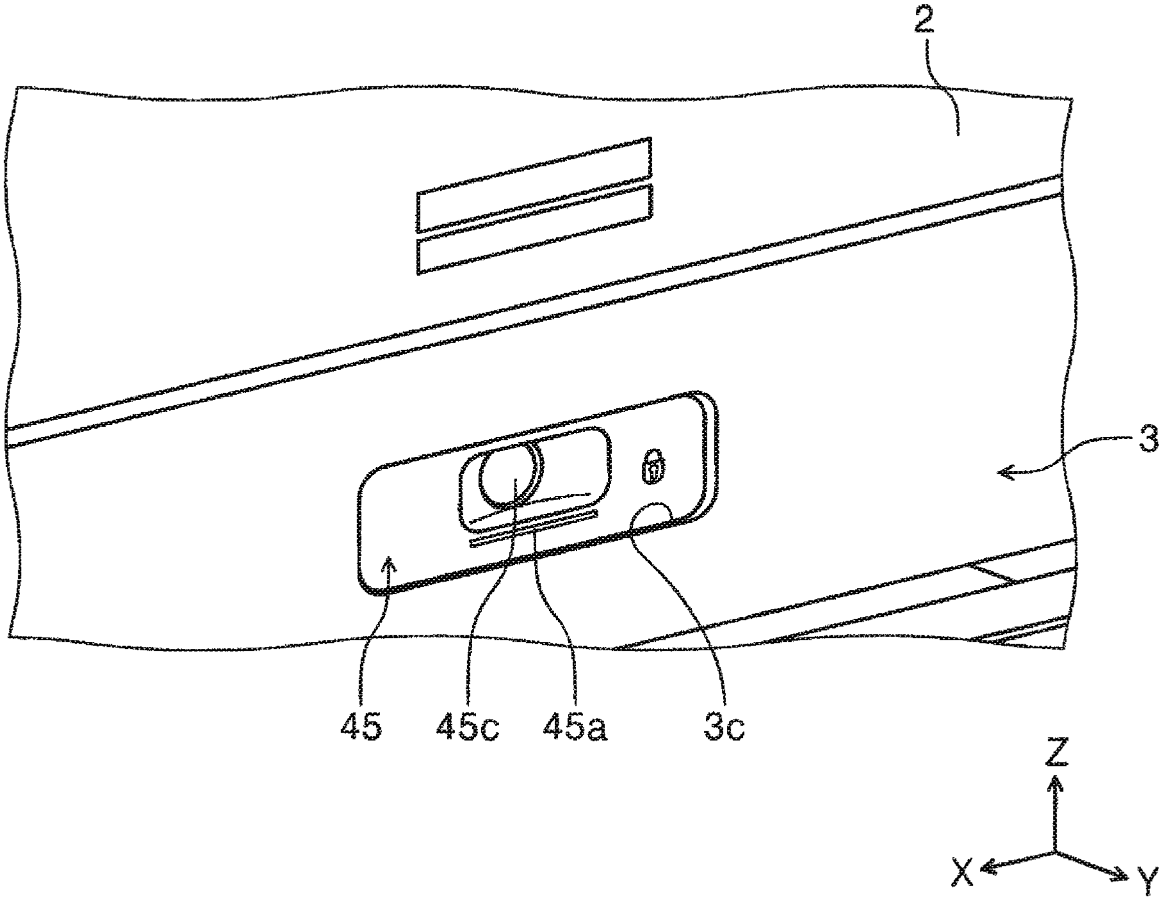
FIG. 7 is a partial enlarged perspective view of the first paper cassette.
Figure 8:
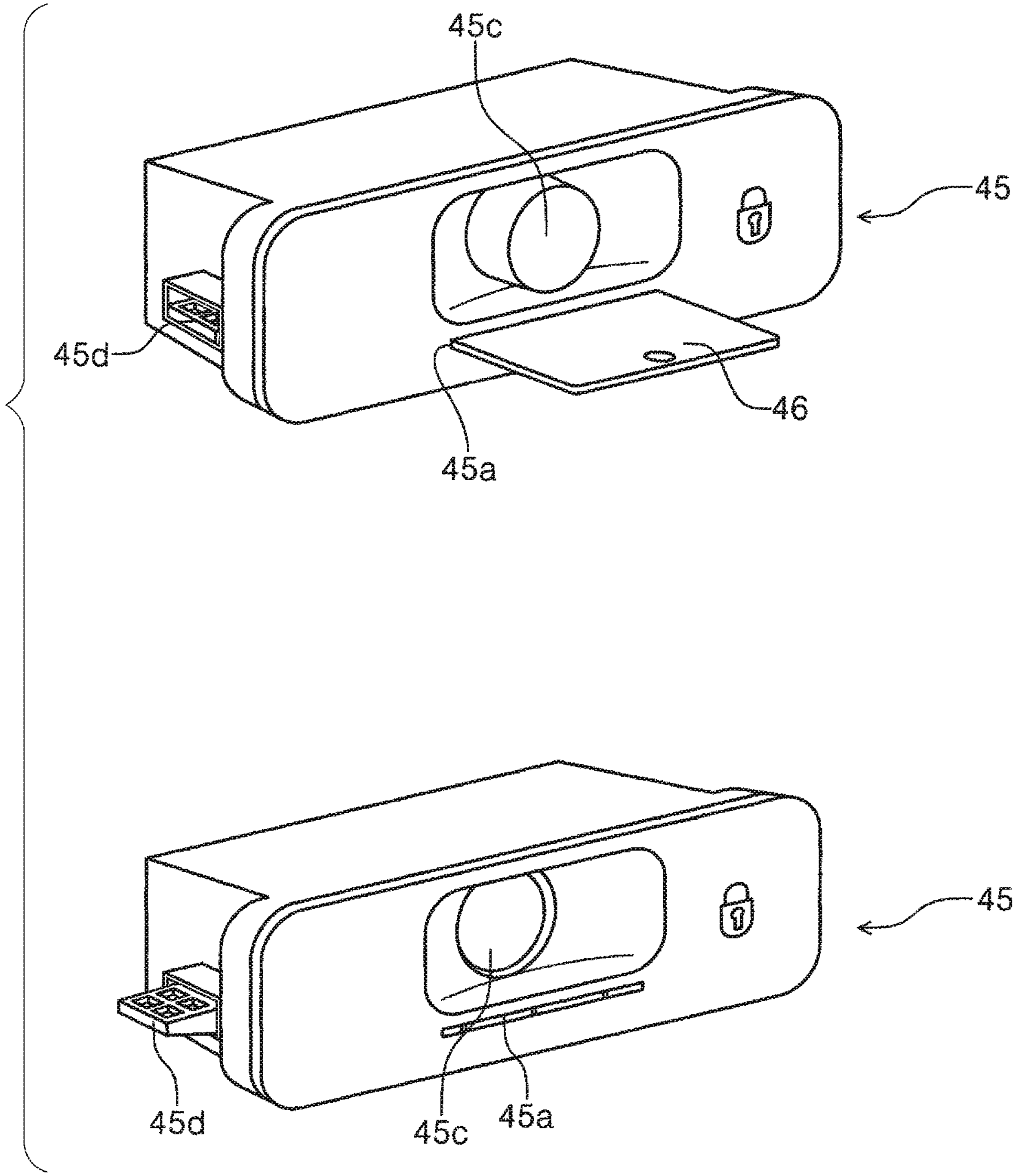
FIG. 8 is a perspective view of a locking portion.

Next, with reference to FIGS. 6, 7, and 8, the structure of the first paper cassette 3 will now be further explained. As illustrated in FIG. 6, the first paper cassette 3 includes a chassis 3*e* and an exterior member 3*d* provided on the chassis 3*e* in the +Y direction. When the first paper cassette 3 is attached to the apparatus body 2, the exterior member 3*d* constitutes the +Y-directional lateral surface of the apparatus body 2 as illustrated in FIG. 7. In FIG. 6, a first accommodation portion 3*a*, which provides a space for accommodating recording paper, and a second accommodation portion 3*b*, which provides a space for accommodating the ink containers 10A and 10B and the waste liquid container 11, are provided inside the chassis 3*e*. The reference sign X1 denotes a range occupied by the first accommodation portion 3*a* in the paper feeding-out direction, that is, in the X-axis direction. The reference sign X2 denotes a range occupied by the second accommodation portion 3*b* in this direction.

The ink containers 10A and 10B and the waste liquid container 11 are hidden behind the exterior member 3*d* when the first paper cassette 3 having the above structure is attached to the apparatus body 2. The ink containers 10A and 10B and the waste liquid container 11 become exposed to the outside when the first paper cassette 3 is drawn out of the apparatus body 2. That is, drawing the first paper cassette 3 out of the apparatus body 2 makes it possible not only to put sheets of recording paper into the first paper cassette 3 but also to replenish the ink container 10A, 10B with ink and collect waste liquid from the waste liquid container 11. Therefore, it is unnecessary to provide a dedicated cover exclusively for the purpose of the opening and closing of the ink containers 10A and 10B and the waste liquid container 11. Therefore, it is possible to reduce the cost of the apparatus.

The exterior member 3*d* has a recess 3*c* used as a finger-hooking portion when the first paper cassette 3 is drawn out of the apparatus body 2. It is possible to detachably attach a locking portion 45 to the recess 3*c* as illustrated in FIG. 7. The locking portion 45 has a lock 45*d* that locks the locking portion 45 into the recess 3*c* when inserted into the recess 3 as illustrated in FIG. 8. The lock 45*d* is configured to be able to advance and retract in the X-axis direction. As illustrated in the upper part of FIG. 8, the lock 45*d* is in a retracted state when a lock button 45*c* protrudes in the +Y direction. The lock 45*d* advances when the lock button 45*c* is pushed inward in the −Y direction from a protruding state as illustrated in the lower part of FIG. 8. Because of this lock advancement, the locking portion 45 becomes locked inside the recess 3*c*. The locking portion 45 has a keyhole 45*a*. The locking portion 45 becomes unlocked from the above-described locked state when a key member 46 is inserted into the keyhole 45*a*.

As described above, the first paper cassette 3 has the recess 3*c* used as a finger-hooking portion when the first paper cassette 3 is drawn out of the apparatus body 2. The locking portion 45, which is switchable between a locked state and an unlocked state, can be detachably attached to the recess 3*c*. The locking portion 45 fills the space of the recess 3*c* when in the locked state. The lock is released when the locking portion 45 is unlocked. Because of this structure, it is possible to prevent unintended access to the first paper cassette 3, the ink containers 10A and 10B, and the waste liquid container 11.

The scope of the present disclosure is not limited to the foregoing embodiments. The present disclosure can be modified in various ways within the scope of the recitation of appended claims. Needless to say, such modifications are within the scope of the present disclosure.

What is claimed is:

1. A recording apparatus, comprising:

a plurality of medium containing units that is provided along a vertical direction and contains a medium before recording;

a liquid ejecting head that performs recording by ejecting a liquid toward the medium; and at least one liquid containing unit that contains the liquid; wherein the plurality of medium containing units includes a first medium containing unit located at an uppermost position, and a second medium containing unit located below the first medium containing unit, a size of the first medium containing unit in a medium feeding-out direction, in which the medium is fed out, is smaller than a size of the second medium containing unit in the medium feeding-out direction, and further comprising a pickup roller that feeds out the medium contained in the first medium containing unit; and a pair of feeding rollers that feeds the medium fed out by the pickup roller; wherein the at least one liquid containing unit has a same level of height as the pickup roller and the pair of feeding rollers in the vertical direction.

2. The recording apparatus according to claim 1, wherein a size of the at least one liquid containing unit in the vertical direction is larger than a size of the first medium containing unit, a portion of the at least one liquid containing unit is disposed above the first medium containing unit in the vertical direction, and the portion of the at least one liquid containing unit has the same level of height as the pickup roller and the pair of feeding roller in the vertical direction.

3. The recording apparatus according to claim 1, wherein the at least one liquid containing unit is provided above the second medium containing unit in such a way that a portion of the at least one liquid containing unit has a higher level of height than the first medium containing unit in a vertical direction when viewed from the side surface.

4. The recording apparatus according to claim 1, comprising as the at least one liquid containing unit:

a first liquid containing unit that contains the liquid before ejection from the liquid ejecting head; and a second liquid containing unit that contains the liquid as waste liquid after ejection from the liquid ejecting head; wherein the first liquid containing unit and the second liquid containing unit are provided above the second medium containing unit in such a way that a portion of the first liquid containing unit and a portion of the second liquid containing unit have a higher level of height than the first medium containing unit in the vertical direction when viewed from the side surface.

5. The recording apparatus according to claim 4, further comprising:

a cap unit that includes a capping portion and is configured to switch between a capping position and a distanced position, the capping portion being configured to cap the liquid ejecting head, the capping position being a position where the capping portion caps the liquid ejecting head, the distanced position being a position where the capping portion is away from the liquid ejecting head; wherein, when the cap unit is located at the distanced position, the second liquid containing unit is located at a position that is closer to the cap unit than the first liquid containing unit is.

6. The recording apparatus according to claim 1, wherein the at least one liquid containing unit is provided between an end of the first medium containing unit and an end of the second medium containing unit in front view.

7. The recording apparatus according to claim 1, wherein a number of sheets of the medium which the first medium containing unit is able to accommodate is larger than a number of sheets of the medium which the second medium containing unit is able to accommodate.

8. The recording apparatus according to claim 7, wherein a size of a largest-sized medium in the medium feeding-out direction among sizes which the first medium containing unit is able to accommodate corresponds to a longer side of an A4-sized medium, and a size of a largest-sized medium in the medium feeding-out direction among sizes which the second medium containing unit is able to accommodate corresponds to a longer side of an A3-sized medium.

9. The recording apparatus according to claim 1, wherein the first medium containing unit is configured to be attached to an apparatus body that includes the liquid ejecting head and be drawn out of the apparatus body, the first medium containing unit includes an exterior member that constitutes an exterior surface part of the apparatus body when the first medium containing unit is attached to the apparatus body, and the at least one liquid containing unit provided in such a way that a portion of the at least one liquid containing unit has a higher level of height than the first medium containing unit in the vertical direction is hidden behind the exterior member when the first medium containing unit is attached to the apparatus body, and becomes exposed to an outside when the first medium containing unit is drawn out of the apparatus body.

10. The recording apparatus according to claim 9, wherein the first medium containing unit has a recess used as a finger-hooking portion when the first medium containing unit is drawn out of the apparatus body, and a locking portion that is switchable between a locked state, in which the locking portion locks in a state of filling a space of the recess, and an unlocked state, in which the lock is released, is configured to be detachably attached to the recess.

11. The recording apparatus according to claim 9, wherein the at least one liquid containing unit provided above the second medium containing unit in such a way that a portion of the at least one liquid containing unit is higher than the first medium containing unit in the vertical direction is entirely inside an area of the second medium containing unit in the medium feeding-out direction.

* * * * *